(No Model.)
J. A. STAGG.
CURTAIN FIXTURE.
No. 580,064.   Patented Apr. 6, 1897.
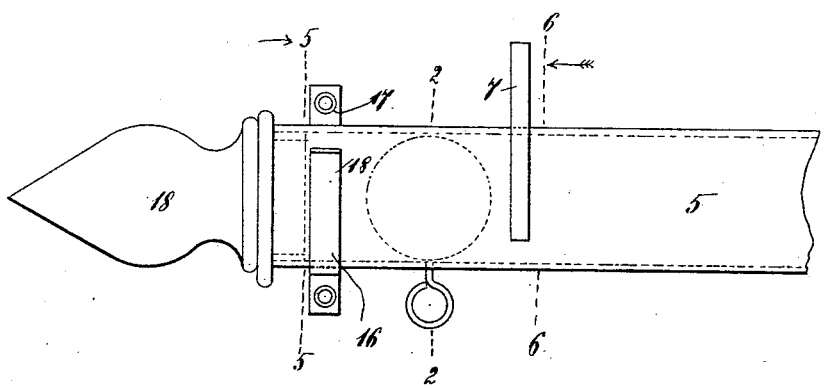
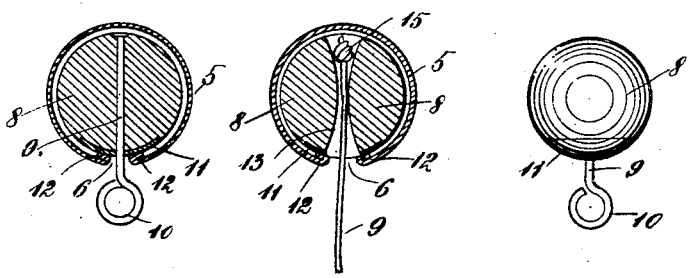
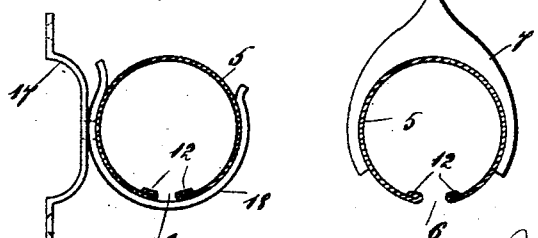
WITNESSES
INVENTOR
John A. Stagg
BY
Edgar Tate
ATTORNEYS.

UNITED STATES PATENT OFFICE.

JOHN ALFRED STAGG, OF WASHINGTON, DISTRICT OF COLUMBIA.

CURTAIN-FIXTURE.

SPECIFICATION forming part of Letters Patent No. 580,064, dated April 6, 1897.

Application filed July 10, 1896. Serial No. 598,715. (No model.)

*To all whom it may concern:*

Be it known that I, JOHN ALFRED STAGG, a citizen of the United States, and a resident of Washington, in the District of Columbia, have invented certain new and useful Improvements in Curtain-Fixtures, of which the following is a specification, reference being had to the accompanying drawings, forming a part thereof, in which similar numerals of reference indicate corresponding parts wherever found throughout the several views.

This invention relates to curtain-fixtures; and the object thereof is to provide an improved device of this class which is simple in construction and operation and comparatively inexpensive; and with this and other objects in view the invention consists in the construction, combination, and arrangement of parts hereinafter described and claimed.

The invention is fully disclosed in the following specification, of which the accompanying drawings form a part, in which—

Figure 1 is a front view of a portion of my improved curtain-fixture; Fig. 2, a section on the line 2 2 of Fig. 1; Fig. 3, a similar view showing a modified form of construction; Fig. 4, a side view of one of the suspending devices which I employ; Fig. 5, a section on the line 5 5 of Fig. 1, and Fig. 6 a section on the line 6 6.

In the practice of my invention I provide a curtain-fixture which comprises a tubular pole 5, having a longitudinal slot 6 formed in the bottom thereof and which extends from one end to the other, and the pole 5 is preferably composed of thin sheet metal, but may be composed of any desired material. I also provide ornamental U-shaped bracket attachments 7, which are connected with said pole, as shown in Figs. 1 and 6, by friction or otherwise, and which extend nearly around the same and which project upwardly therefrom, and these brackets may be of any desired form or shape and may be ornamented in any desired manner, and are designed to give strength and stability to the pole when made of thin sheet metal or similar material and to prevent the same from buckling or bending or the slot from becoming distended or spreading by means of the pressure exerted by the clamp upon the sides of the pole, as will be readily understood.

The suspending devices which I employ and by means of which a curtain, portière, or other article may be connected with the pole 5 consist of balls or spherical bodies 8, which may be composed of any desired material and which are adapted to slide in said tubular pole and through which is passed, as shown in Fig. 2, a rod 9, which is provided with an eye or ring 10 at its lower end, and said balls or bodies are provided on their under surfaces with metal plates 11, and the edges or sides of the slot 6 are inwardly curved, as shown at 12, and the arrangement is such that the metal plates 11, which conform in shape to the surface of the balls or spherical bodies, rest upon and slide upon the inwardly-curved sides or edges 12 of the slot 6, thus reducing the friction caused by moving the balls or spherical bodies 8 from one point to another within the pole.

The balls or bodies 8 are less in diameter than the inner diameter of the pole and are free to move therein, as hereinbefore described, and in place of the construction shown in Fig. 2 I may substitute that shown in Fig. 3, in which said balls or bodies are provided with transverse bores or passages 13, the ends of which are preferably larger than the central portion thereof, and through said transverse bore or passage is passed a rope, cord, or other device 9, one end of which is knotted, as shown at 15, to prevent its passing through the ball or body, and the other end of which may be connected with a curtain, portière, or other article in any desired manner.

The means which I employ for supporting the pole 5 consist of brackets 16, which are made as shown in Figs. 1 and 5, and which consist of plates 17, which are adapted to be secured to a wall or other support and which are provided with semicircular or segmental loops or bands 18, in which the pole is placed, and the ends of said pole are closed by ornamental blocks or end pieces 19 in the usual manner, which also close the ends of the slot 6.

My improved curtain-fixture is simple in construction and operation and is comparatively inexpensive, and by means thereof a curtain, portière, or other article may be moved from the center to the end thereof or from one side to another, and it will be apparent that any desired number of the balls or bodies 8 may be employed, and the fixture may be of any desired length.

Having fully described my invention, I claim as new and desire to secure by Letters Patent—

1. A support for curtains, portières, and other articles, comprising a tubular pole, having a longitudinal slot in the bottom thereof, ornamental brackets or yokes which are connected therewith, and which inclose the same as described, and which are also designed to give strength and stability thereto, and sliding suspending devices to which a curtain, portière or other article may be secured, said devices consisting of balls or spherical bodies, which are placed in said tubular pole, and through which pass devices which extend through the slot in said pole, and with which the curtain, portière or other article is adapted to be connected, the sides or edges of the slot in the pole being inwardly curved, and said balls or bodies being provided with metal plates on their under surfaces or sides, which rest on said inwardly-curved sides of the slot, substantially as shown and described.

2. A support for curtains, portières, and other articles, comprising a tubular pole, having a longitudinal slot in the bottom thereof, ornamental brackets or yokes which are connected therewith, and which inclose the same as described, and which are also designed to give strength and stability thereto, and sliding suspending devices to which a curtain, portière or other article may be secured, said devices consisting of balls or spherical bodies, which are placed in said tubular pole, and through which pass devices which extend through the slot in said pole, and with which the curtain, portière or other article is adapted to be connected, the sides or edges of the slot in the pole, being inwardly curved, and said balls or bodies being provided with metal plates on their under surfaces, or sides, which rest on said inwardly-curved sides of the slot, and said tubular pole being provided with end pieces, whereby the ends thereof, and of the slot in the bottom thereof, are closed, substantially as shown and described.

In testimony that I claim the foregoing as my invention I have signed my name, in presence of the subscribing witnesses, this 6th day of July, 1896.

JOHN ALFRED STAGG.

Witnesses:
C. D. MERWIN,
E. A. JOHNSON.